（12) United States Patent
Hershey et al.

(10) Patent No.: US 8,126,628 B2
(45) Date of Patent: Feb. 28, 2012

(54) AIRCRAFT GAS TURBINE ENGINE BLADE TIP CLEARANCE CONTROL

(75) Inventors: John Erik Hershey, Ballston Lake, NY (US); Brock Estel Osborn, Niskayuna, NY (US); Donald Lee Gardner, West Chester, OH (US); Rafael Jose Ruiz, Liberty Township, OH (US); William Lee Herron, Springdale, OH (US)

(73) Assignee: General Electric Company, Schenectady, NY (US)

( * ) Notice: Subject to any disclaimer, the term of this patent is extended or adjusted under 35 U.S.C. 154(b) by 1108 days.

(21) Appl. No.: 11/833,596

(22) Filed: Aug. 3, 2007

(65) Prior Publication Data

US 2009/0037035 A1    Feb. 5, 2009

(51) Int. Cl.
*G06F 19/00*        (2011.01)
*G06G 7/70*         (2006.01)

(52) U.S. Cl. ...... 701/100; 701/3; 415/173.1; 415/173.2; 244/75.1; 60/782

(58) Field of Classification Search .............. 701/3, 100; 415/1, 13, 17, 173.1, 173.2, 173.3, 175, 177, 415/178; 244/53 R, 75.1, 194; 60/782, 785
See application file for complete search history.

(56) References Cited

U.S. PATENT DOCUMENTS 4,230,436 A    10/1980 Davison
(Continued)

*Primary Examiner* — Khoi Tran
*Assistant Examiner* — Jamie Figueroa
(74) *Attorney, Agent, or Firm* — William Scott Andes; Steven J. Rosen

(57) ABSTRACT

A method and system adjusts blade tip clearance between rotating aircraft gas turbine engine blade tips and a surrounding shroud in anticipation of and before an engine command that changes an engine rotational speed. The method may include determining when to begin adjusting the tip clearance by expanding or contracting the shroud before the engine command and may be based on monitored aircraft and/or aircraft crew data indicative of the engine. The aircraft and/or aircraft crew data may include communications between aircraft crew and air traffic control authorities or air traffic control surrogates. Determining when to begin adjusting the tip clearance may include using learning algorithms which may use the aircraft gas turbine engine's operating experience and/or operating experience of other jet engines on an aircraft containing the aircraft gas turbine engine and/or on other aircraft.

36 Claims, 10 Drawing Sheets

U.S. PATENT DOCUMENTS

| | | | |
|---|---|---|---|
| 4,304,093 A | 12/1981 | Schulze | |
| 4,513,567 A | 4/1985 | Deveau et al. | |
| 4,856,272 A | 8/1989 | Putman et al. | |
| 4,928,240 A | 5/1990 | Davison et al. | |
| 4,999,991 A | 3/1991 | Haddad et al. | |
| 5,005,352 A | 4/1991 | Schwarz et al. | |
| 5,012,420 A | 4/1991 | Walker et al. | |
| 5,081,830 A | 1/1992 | Schwarz et al. | |
| 5,088,885 A | 2/1992 | Schwarz et al. | |
| 5,090,193 A | 2/1992 | Schwarz et al. | |
| 5,205,115 A | 4/1993 | Plemmons et al. | |
| 6,155,038 A * | 12/2000 | Irwin et al. | 60/782 |
| 6,487,491 B1 * | 11/2002 | Karpman et al. | 701/100 |
| 6,498,978 B2 | 12/2002 | Leamy et al. | |
| 6,868,325 B2 | 3/2005 | Menon et al. | |
| 6,943,699 B2 | 9/2005 | Ziarno | |
| 7,013,239 B2 | 3/2006 | Hedlund et al. | |
| 7,043,348 B2 | 5/2006 | Uluyol | |
| 2004/0219011 A1 * | 11/2004 | Albers et al. | 415/174.2 |
| 2005/0017876 A1 | 1/2005 | Ziarno | |
| 2005/0144274 A1 | 6/2005 | Osborn et al. | |
| 2005/0149274 A1 | 7/2005 | Finnigan et al. | |
| 2006/0042266 A1 * | 3/2006 | Albers et al. | 60/782 |
| 2006/0212281 A1 | 9/2006 | Mathews, Jr. et al. | |
| 2007/0043497 A1 * | 2/2007 | Leogrande et al. | 701/100 |
| 2007/0055392 A1 * | 3/2007 | D'Amato et al. | 700/44 |
| 2007/0101178 A1 | 5/2007 | Jammu et al. | |
| 2007/0140839 A1 * | 6/2007 | Bucaro et al. | 415/178 |
| 2007/0276578 A1 * | 11/2007 | Herron et al. | 701/100 |
| 2008/0112797 A1 * | 5/2008 | Seitzer et al. | 415/116 |
| 2009/0003991 A1 * | 1/2009 | Andarawis et al. | 415/118 |
| 2009/0064522 A1 * | 3/2009 | Herron et al. | 33/655 |

\* cited by examiner

AIRCRAFT GAS TURBINE ENGINE BLADE TIP CLEARANCE CONTROL

BACKGROUND OF THE INVENTION

Field of the Invention

This invention relates to clearance control to maintain tip clearances between rotors and stators and, more particularly, to such methods and systems used maintain to blade tip clearances in aircraft gas turbine engines.

Engine performance parameters such as thrust, specific fuel consumption (SFC), and exhaust gas temperature (EGT) margin are strongly dependent upon tip clearances between turbine blade tips and static seals or shrouds surrounding the blade tips. The clearances between the turbine blade tips and static seals or shrouds should be minimized while avoiding rubs between the turbine blade tips and static seals or shrouds. The problem in minimizing these tip clearances is that the blade tip length from rotor center or engine axis grows at a different rate than the shroud can expand or contract to accommodate the change in blade length, especially during transient operations. This may result in the blade tip touching the shroud, a condition known as a rub, or in excess clearance, which causes poor engine performance and reduces the lives or the blade and the shroud.

These clearances are affected by the different amounts and rates of thermal and mechanical growth of the rotor and stator components. Mechanical growths are due to centrifugal force which occurs as speeds and pressures change. Blade and rotor growth is typically much greater than is that of the stator. Thermal growth of the stator is generally greater than that of the rotor, and it occurs much more quickly. Blade thermal growth is quickest of the three. It is highly desirable to match these different growths while maintaining as tight a clearance as is practical throughout the transient and steady state operation of the engine.

The blade length from rotor center to the blade tip grows in proportion to the square of the rotor angular velocity and linearly with temperature. Both effects are brought about by increasing fuel flow required for such maneuvers as climb, certain parts of the descent/landing sequence, and evasive actions. Under active clearance control, the shroud is made to expand by bathing it or the turbine casing to which it is mounted in hot air or by bathing the shroud or its turbine casing in cold air. The hot or cold air causes the shroud to expand or contract in a linear fashion by the same physics, thermal growth or contraction, that causes the blade tip length from rotor to grow linearly with temperature.

Active clearance control, one method to match these different growths, is a well known method which modulates a flow of relatively cool or hot air from the engine fan and/or compressor and spray it on high and/or low pressure turbine casings to shrink the casings relative to the high and low pressure turbine blade tips under steady state, high altitude cruise conditions. The air may be flowed to or sprayed on other static structures used to support the shrouds or seals around the blade tips such as flanges or pseudo-flanges.

SUMMARY OF THE INVENTION

A method to adjust blade tip clearance between rotating blade tips and a surrounding shroud in an aircraft gas turbine engine in flight changes the tip clearance in anticipation of and before an engine command, for example climb, that changes an engine rotational speed. Changing the tip clearance may be based on monitored aircraft and/or aircraft crew data indicative of the engine command. The aircraft and/or aircraft crew data may include communications between aircraft crew and air traffic control authorities or air traffic control surrogates.

The method may include determining when to begin adjusting the tip clearance by expanding or contracting the shroud a period of time before the engine command that changes the engine rotational speed. Learning algorithms may be used to modify when to begin adjusting the tip clearance. The engine's operating experience and/or operating experience of other jet engines may be used for the learning algorithms. The other jet engines may be on an aircraft containing the aircraft gas turbine engine and/or on other aircraft.

A statistical method may be used for determining when to begin adjusting the tip clearance. The statistical method may be selected from a group consisting of statistical methods, correlation methods, multivariate statistical process analysis, and pattern recognition methods. The statistical method may be a pattern recognition method selected from a group consisting of Bayesian decision theory, neural networks, fuzzy logic, Parzen windows, nearest neighbor classification, hidden Markov models, linear and non-linear discriminant analysis, Markov random fields, Boltzmann learning, classification and regression trees, and multivariate adaptive regression.

The method may be used as an override to an active clearance control flow model used to schedule desired blade tip clearance.

BRIEF DESCRIPTION OF THE DRAWINGS

The foregoing aspects and other features of the invention are explained in the following description, taken in connection with the accompanying drawings where.

DETAILED DESCRIPTION OF THE INVENTION

Figure 1:
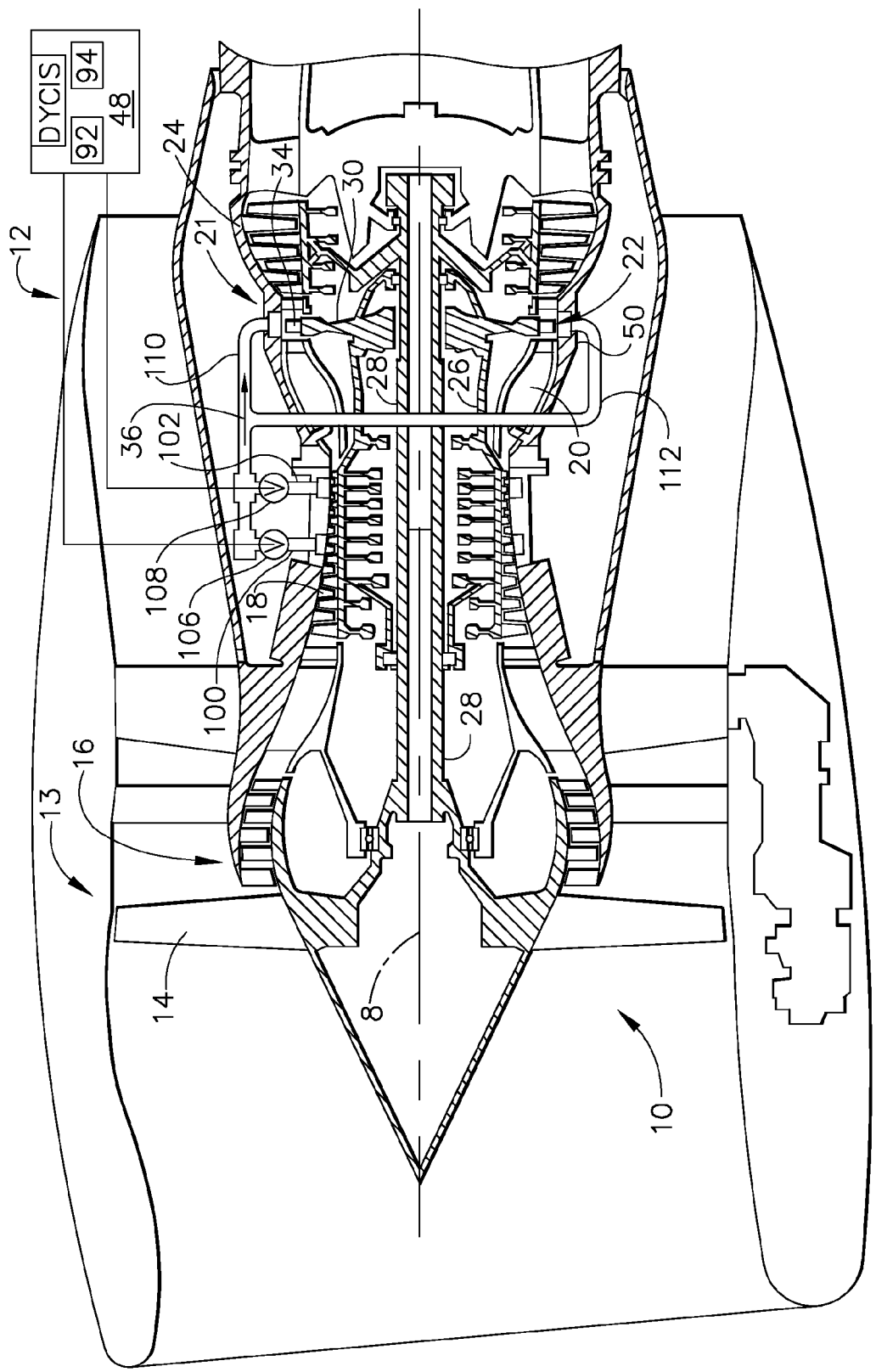
FIG. 1 is a cross-sectional view illustration of an aircraft gas turbine engine with an anticipatory blade tip clearance control method and system.

Schematically illustrated in cross-section in FIG. 1 is an exemplary embodiment of an aircraft gas turbine engine 10, such as a GE CFM56 series engine, including an active clearance control system 12. The engine 10 has, in downstream serial flow relationship, a fan section 13 including a fan 14, a booster or low pressure compressor (LPC) 16, a high pressure compressor (HPC) 18, a combustion section 20, a high pressure turbine (HPT) 22, and a low pressure turbine (LPT) 24. A high pressure shaft 26 disposed about an engine axis 8 drivingly connects the HPT 22 to the HPC 18 and a low pressure shaft 28 drivingly connects the LPT 24 to the LPC 16 and the fan 14. The HPT 22 includes an HPT rotor 30 having turbine blades 34 mounted at a periphery of the rotor 30. The blades 34 includes airfoils 37 extending radially outwardly from blade platforms 39 to radially outer blade tips 82 of the blades 34 and airfoils 37 as illustrated in FIG. 2.

A mid-stage air supply 100 and a high stage air supply 102 (typically drawing air from 4th and 9th stages respectively of HPC 18 in a CFM56 engine) are used as sources for thermal control air 36 which is supplied to a turbine blade clearance control apparatus generally shown at 21 through first and second thermal control air supply tubes 110, 112 respectively. The temperature of the thermal control air 36 is controlled by using modulating the amount of air bled from the mid-stage air supply 100 and the high stage air supply 102 with mid-stage and high stage air valves 106, 108 respectively. A distribution manifold system 50 encircles the high pressure turbine 22. The manifold system 50 distributes the thermal control air 36 to a plurality of annular spray tubes 60 circumscribed about the engine axis 8 as illustrated in FIGS. 1 and 2.

Figure 2:
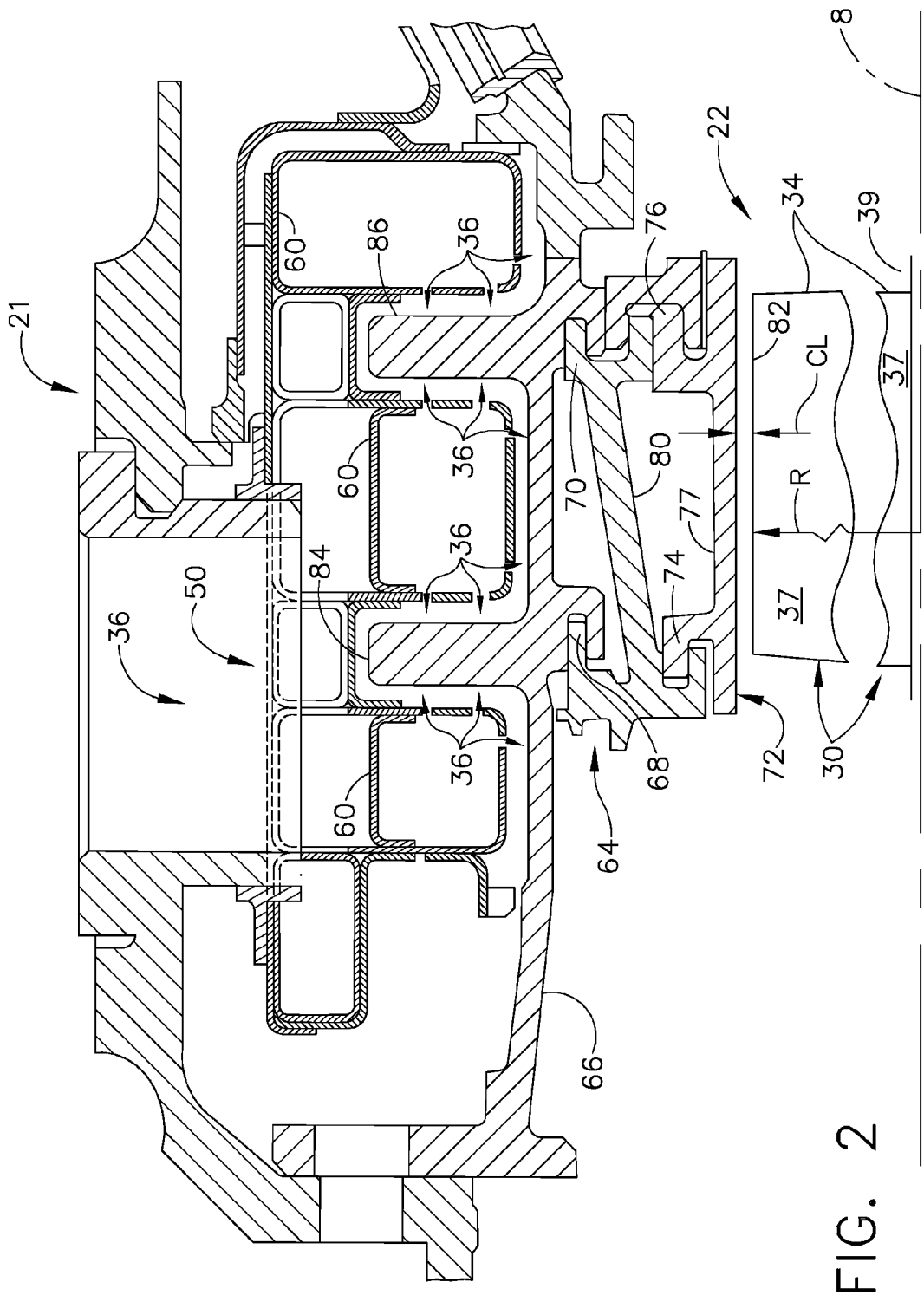
FIG. 2 is an enlarged cross-sectional view illustration of a high pressure turbine assembly illustrating turbine rotor blade tip clearance and control thereof in the engine illustrated in FIG. 1.

The time constants describing a rate of growth of a blade radius R as measured from the engine axis 8 (rotor center) to the blade tip 82 illustrated in FIG. 2 and a rate of growth of expansion or contraction of the shroud 72 are markedly different with the blade radius R exhibiting a faster response to temperature. Disclosed herein is a method and system for anticipating the onset of an engine transient, which typically involves an increase or decrease in fuel flow and core rotor speed (N2), in order to start shroud expansion or contraction a period of time DT before the engine transient. This method is designed to expand the shroud faster than lengthening of the blades and, thereby, reduce the probability of a rub while still maintaining a small as possible tip clearance between the blade tips and the surrounding shroud thereby gaining engine fuel efficiency.

Illustrated in FIG. 2 is a first turbine stator assembly 64 attached to a radially outer casing 66 of the HPT 22 by forward and aft case hooks 68, 70. The stator assembly 64 includes an annular segmented stator shroud 72 having shroud segments 77 mounted by forward and aft shroud hooks 74, 76 to an annular segmented shroud support 80 of the first turbine stator assembly 64. The shroud 72 circumscribes the blade tips 82 of turbine blades 34 of the rotor 30 and helps reduce the flow from leaking around the blade tips 82. The active clearance control system 12 is used to minimize the radial blade tip clearance CL between the blade tip 82 and the shroud 72, particularly during cruise operation of the engine 10.

Thermal control air is impinged on and flowed over forward and aft thermal control rings 84, 86 and, thus, to control the turbine blade tip clearance CL. The shroud segments 77 are supported radially outwardly by the forward and aft thermal control rings 84, 86 and thus move radially inwardly when the thermal control rings 84, 86 are cooled and radially outwardly when the thermal control rings 84, 86 are heated. Active clearance control may also be effected by blowing or impinging thermal control air, typically cooling air, on an exterior or interior turbine casing that supports a stator shroud.

The mid-stage and high stage air valves 106, 108 and the amount of thermal control air 36 impinged for controlling turbine blade tip clearances CL, illustrated in FIG. 2, is controlled by the controller 48 illustrated in FIG. 1. The thermal control air 36 is either heating or cooling air in the exemplary embodiment of the active clearance control system 12 illustrated herein. The controller 48 is illustrated herein as a digital electronic engine control system often referred to as a Full Authority Digital Engine Control (FADEC). The controller 48 controls the amount and temperature if so desired of the thermal control air 36 impinged on the forward and aft thermal control rings 84, 86 to control the turbine blade tip clearance CL.

An algorithm or mathematical computational active clearance control flow model hereinafter referred to as ACC flow model 92 is used to control the turbine blade tip clearance CL and is stored and run in the controller 48. The ACC flow model 92 is based on engine operating parameters and physical properties of various parts of the engine. The controller 48 sends valve position signals to the mid-stage and high stage air valves 106, 108 based on the computational ACC flow model 92 to control the total amount of thermal control air 36. The air valves are opened in increments according to the valve position signals.

In the exemplary embodiment illustrated herein, the ACC flow model 92 calculates or measures a real time or instantaneous clearance blade tip clearance CL. This blade tip clearance will be referenced to herein as an instantaneous clearance. The clearance model program CLM runs in background in FADEC after the engine is started. Calculating, often referred to as synthesizing, the instantaneous blade tip clearance CL is typically based on a first set of engine operating parameters including physical properties of various parts of the engine. The first set of engine operating parameters typically includes but is not limited to rotor and stator time constants, measured core rotor speed (N2), air flows, temperatures & pressures, time since throttle movement, and altitude. The instantaneous blade tip clearance may also be measured instead of synthesized or calculated or may be a combination of both measured and calculated methods.

A schedule of desired blade tip clearance, referred to herein as demand clearance DCL is stored in the system. The demand clearance DCL may also be calculated or determined by the clearance model program CLM based on a second set of engine operating parameters including physical properties of various parts of the engine. The demand clearance DCL is set to minimize fuel consumption while avoiding rubs and their effects and to minimize the overall and cumulative detrimental effects of rubs. An exemplary dynamic blade tip clearance system illustrated herein as a dynamic clearance intelligence system (DYCIS) is used to improve setting the blade clearance CL. DYCIS is a state-based dynamic stochastic system that helps control the blade tip clearance CL between the blade tip 82 and the shroud 72 surrounding the blades in the turbine hot section by optimally controlling the blade tip clearances under varying operating conditions. The exemplary embodiment of the DYCIS disclosed herein is stored and run in the controller 48. It may be part of the ACC flow model 92 used to control the turbine blade tip clearance CL and it also may be in the form of an override to the ACC flow model 92 or as override to the schedule of desired blade tip clearance, referred to herein as the demand clearance DCL.

An anticipatory blade tip clearance control method 94, illustrated as being stored in the controller 48, may be used for the active clearance control system. The anticipatory blade tip clearance control method 94 anticipates the onset of an engine transient and adjusts the thermal control air 36 in sufficient time to adjust the surrounding shroud 72 and the blade tip clearance CL to avoid rubs or minimize their effects during the engine transient such as acceleration during climb. The anticipatory blade tip clearance control method 94 may be part of DYCIS.

Figure 5:
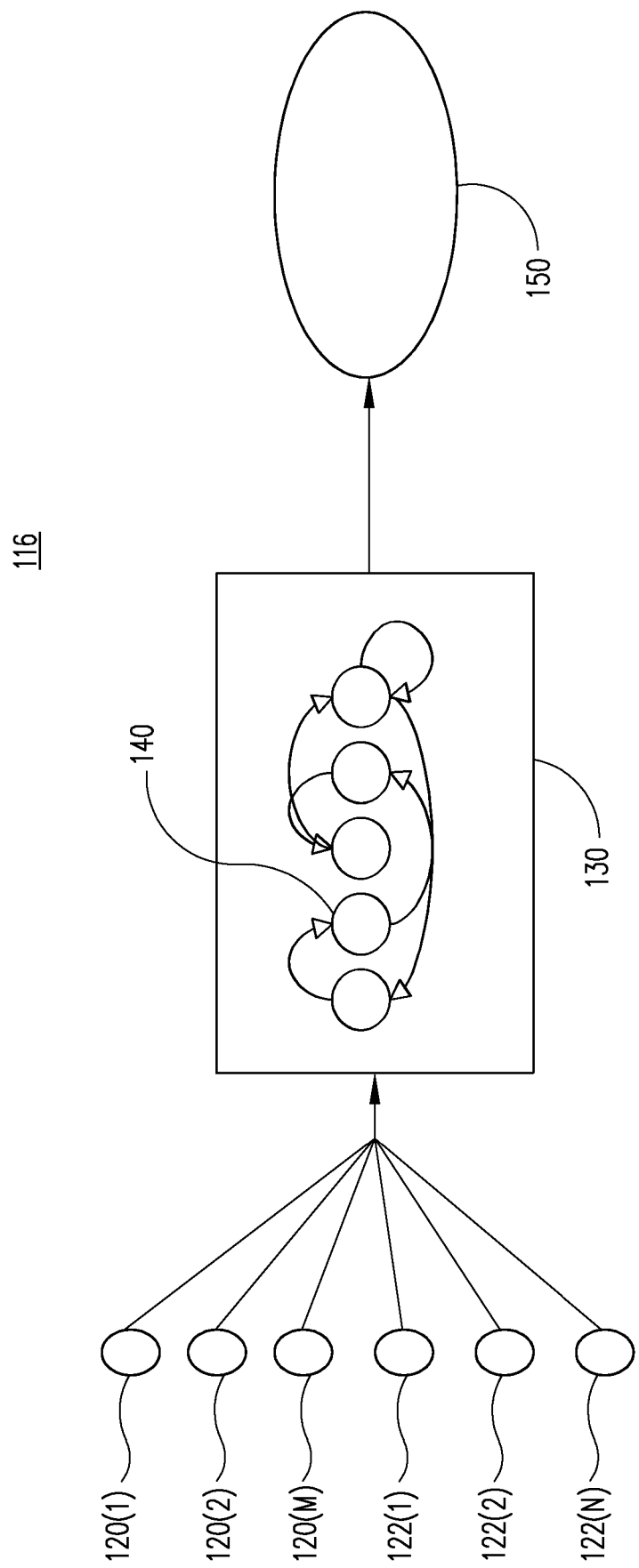
FIG. 5 is a schematical illustration of a statistical method and system to analyze data for the anticipatory blade tip clearance control method for the engine illustrated in FIG. 1.

DYCIS predicts when to initiate a change in the blade tip clearance in sufficient time to adjust the surrounding shroud 72 and avoid rubs or minimize their effects. DYCIS may also be used to determine the required or desired blade tip clearances, illustrated herein as the demand clearance DCL. DYCIS 116, as schematically illustrated in FIG. 5, includes a statistical method in a data analysis module 130 to analyze data from sensors to produce performance data related to the engine and aircraft for active clearance control. The data is used to provide direct insight into the state of the engine's and aircraft's operations with respect to active clearance control system operations allowing DYCIS to draw conclusions and take appropriate actions to maintain the desired blade tip clearances during transient and non-transient engine operation and minimize rubs or the effect or rubs while maximizing fuel efficiency of the engine during non-transient engine operation.

The data analysis module 130 uses at least one statistical technique or method for drawing actionable conclusions from the data to adjust the blade tip clearances CL in anticipation of an engine transient. A number of statistical analysis methods are known in the art and include but are not limited to correlation techniques, multivariate statistical process analysis, and pattern recognition methods. Several pattern recognition techniques are known in the art and are suitable for use by the data analysis module 130 for data analysis. These techniques include, but are not limited to, Bayesian decision theory, neural networks, fuzzy logic, Parzen windows, nearest neighbor classification, hidden Markov models, linear and non-linear discriminant analysis, Markov random fields, Boltzmann learning, classification and regression trees, and multivariate adaptive regression. The exemplary embodiment of the data analysis module 130 illustrated herein employs a Markov chain structure to determine the required or desired blade tip clearances.

The Markov chain structure comprises a plurality of states 140. The output of module 130 is input to a clearance control module 150 which includes the schedule of desired blade tip clearance, referred to herein as demand clearance DCL, in the clearance model program CLM. A plurality of engine sensors 120(1)-120(M) provide input of the second set of monitored engine parameters to the Markov chain structure in module 130. DYCIS control algorithms incorporate elastic and thermodynamic properties of the moving parts. DYCIS also utilizes Bayesian learning algorithms and may dynamically learn from its own experience and from the experience of other engines when to modulate the thermal control air 36 in sufficient time to adjust the surrounding shroud 72 and the blade tip clearance CL and avoid rubs or minimize their effects. DYCIS may also be utilized to dynamically learn what the blade tip clearance CL should be set to during both steady state engine operation such as cruise and during transient engine operation such as climb from its own experience and from the experience of other engines to maximize engine fuel efficiency and avoid rubs or minimize their effects.

The second set of engine operating parameters and/or physical properties used as the monitored engine parameters input into the Markov chain structure in the module 130 include but are not limited to the measured core rotor speed (N2), total air temperature at ambient conditions TAT, the altitude, compressor discharge static pressure (PS3), variable stator vane angle setting(s) (for example in the high pressure compressor), fan speed (N1), exhaust gas temperature (EGT), fan inlet total temperature (T12), fan inlet total pressure (PT2), compressor inlet temperature (T25), fuel flow, longitudinal acceleration, vertical acceleration, EGT exceedance indicator, and the real time or instantaneous clearance blade tip clearance CL.

A plurality of aircraft sensors 122(1)-122(N) provide input of a set of monitored aircraft indicator parameters to the Markov chain structure in module 130. The set of monitored aircraft indicator parameters may include, but not necessarily be limited to, aircraft crew data such as a push to talk (PPT) signal indicating when the pilot or other crew member is talking on his microphone. The set of monitored aircraft indicator parameters may also include environmental conditions that the aircraft is experiencing in its flight, flight leg information such as city-pairs, flight plan, airframe and engine identifiers, crew identifiers, humidity, dust, and data from other aircraft such as turbulence indications. DYCIS may use one or more of these parameters in the Markov chain structure to determine the required or desired blade tip clearances.

The instantaneous blade tip clearance CL is typically used as a current clearance and constantly compared to the demand clearance DCL and the mid-stage and high stage air valves 106, 108 are adjusted in an iterative process until these two clearances are essentially matched. An anticipatory blade tip clearance and control method and system for setting the blade tip clearances and operating the active clearance control system 12 disclosed herein anticipates changes in operating conditions or the engine and/or aircraft and adjusts the clearance in anticipation or before transitory engine operation. The anticipatory blade tip clearance and control method and system may be included in DYCIS or the active clearance control system.

Figure 3:
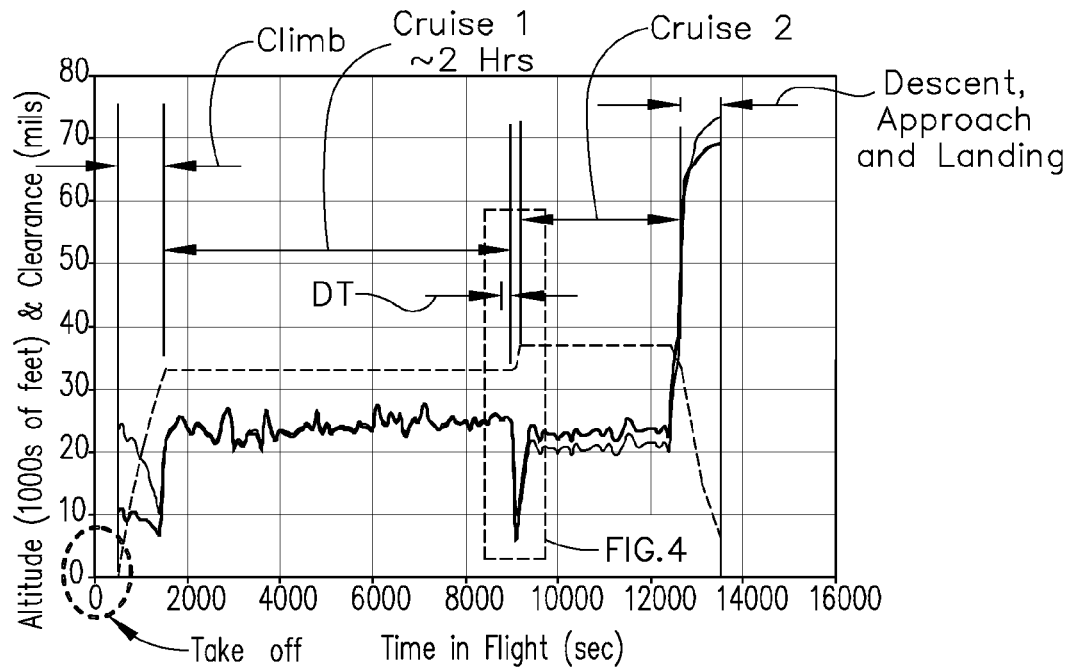
FIG. 3 is a graphical illustration of one embodiment of the anticipatory blade tip clearance control method for the engine illustrated in FIG. 1.
Figure 4:
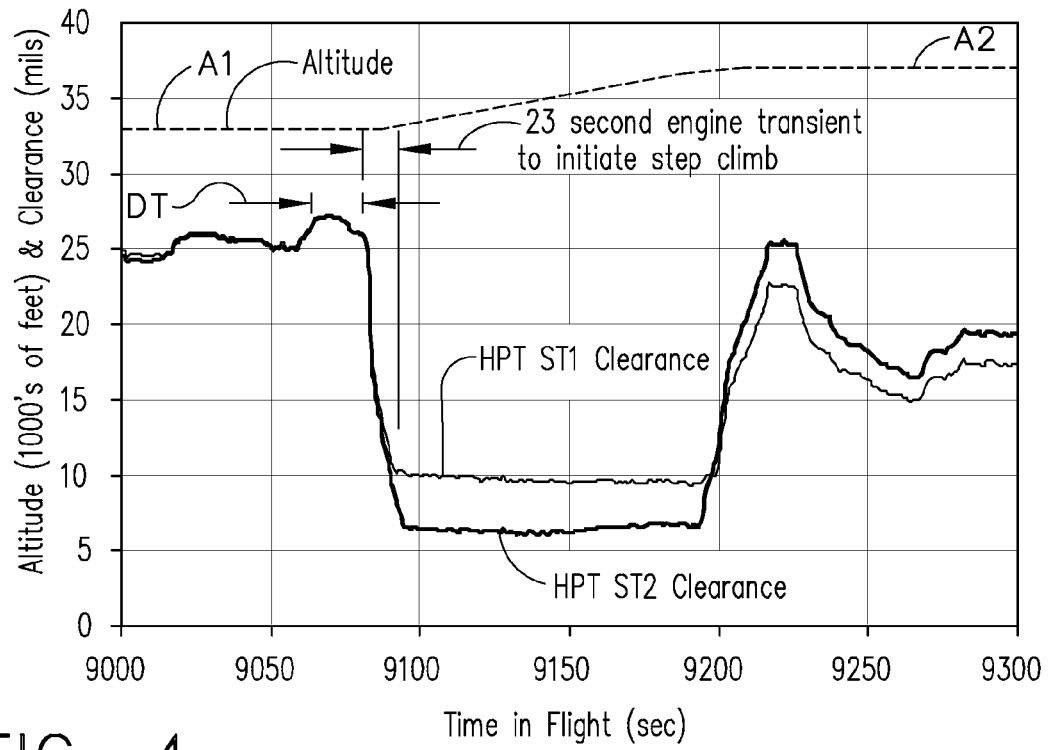
FIG. 4 is an enlarged illustration of the anticipatory control method illustrated in FIG. 3.

The transitory engine operation most important to tip clearances is engine acceleration and deceleration during aircraft climb and descent respectively as illustrated in FIGS. 3 and 4 with respect to an aircraft climb between first and second cruise altitudes A1, A2. By beginning to change tip clearances in anticipation of or before engine acceleration and aircraft climb smaller tip clearances may be maintained during cruise conditions thus improving engine efficiency and improving engine specific fuel consumption (SFC). Cruise tip clearances are set as small as possible but large enough to avoid rubs during transitory engine operation such as during engine acceleration and aircraft climb. Current active clearance control systems begin changing tip clearances when the system detects a change in engine operating parameters such as those enumerated above. By beginning to change tip clearances in anticipation of or before engine acceleration and aircraft climb rubs may still be avoided or minimized while still operating with smaller tip clearances during cruise conditions.

The Markov chain structure within the module 130 is characterized by a plurality of states. Each state in this plurality of states has a table of transition probabilities associated with it. There are thus as many tables of transition probabilities as there are states. The entries in the transition table corresponding to a specific state, give the probabilities of the states to which the Markov chain will transition at time t+Δt if the Markov chain is in that specific state at time t. The probabilities in the transition tables are determined from historical data and may be made more precise over time through incorporating data learned over various flights. The historical data may be from flights of the engine associated with the particular Markov chain, or the historical data may be from other engines, on the same aircraft or on other aircraft, or both. The historical data may include aircraft data such as communications between the aircraft and/or its crew and the ground or other aircraft.

Figure 6:
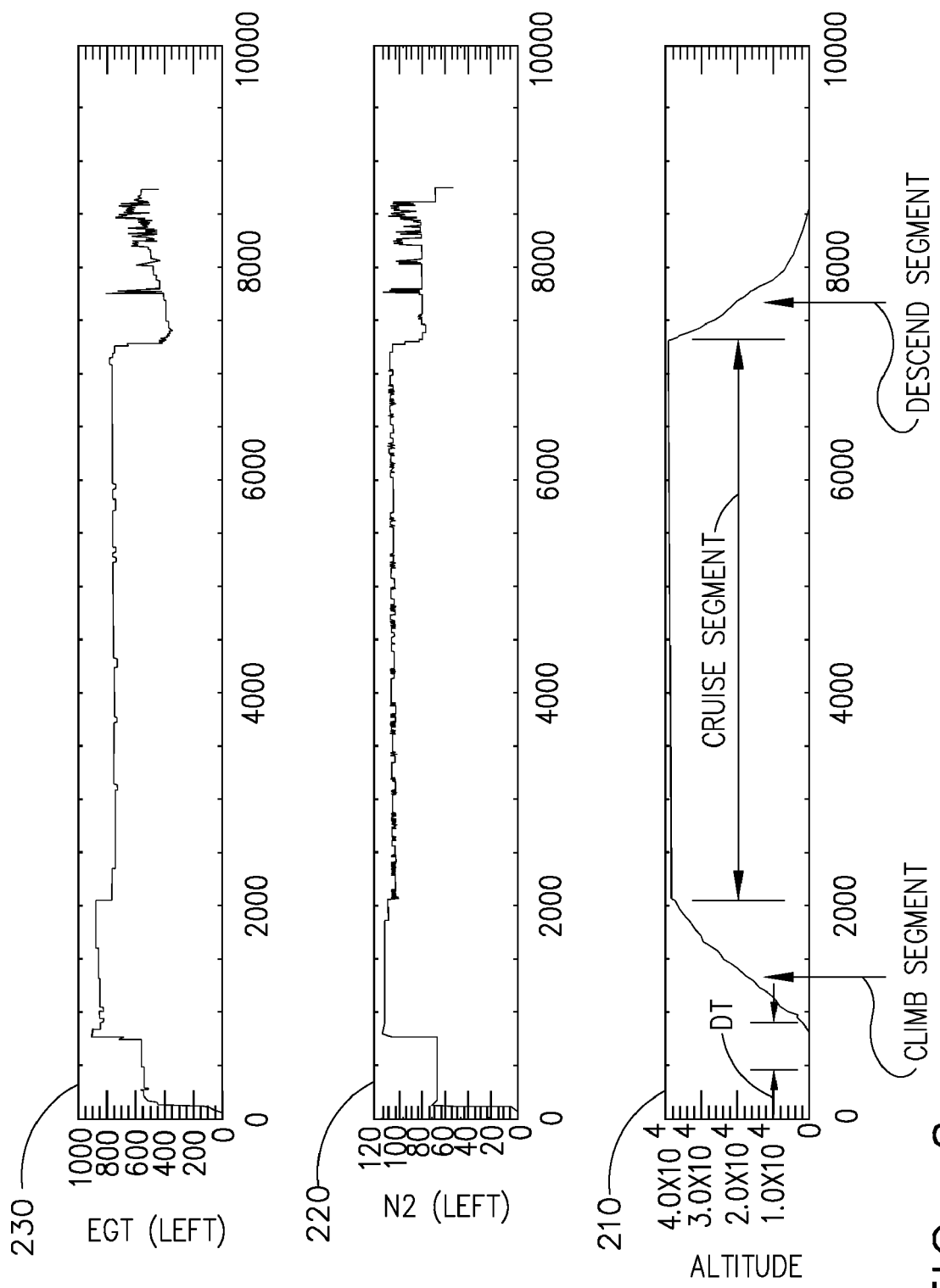
FIG. 6 is a graphical illustration of segments identified by an exemplary embodiment of the anticipatory blade tip clearance control method for the engine illustrated in FIG. 1.

Graphically illustrated in FIG. 6 is a flight of a two engine aircraft in which altitude is displayed in feet against flight time in seconds. The graphs in FIG. 6 illustrates that a flight may be represented in terms of segments or contiguous periods of time that display common features. Graph 210 exhibits at least three such segments that are identified as climb, cruise, and descend, with cruise being the longest of the three segments. Graph 220 displays turbine core speed, N2, in percentage units, for the left engine of the two engine aircraft. Note that N2 is relatively constant or unchanging over the cruise segment. Graph 230 displays exhaust gas temperature (EGT) in degrees Centigrade for the left engine of the two engine aircraft. Note that EGT is also relatively constant or unchanging over the cruise segment.

The turbine blade tip clearance CL may be made small during the cruise segment as there is no transient behavior or relatively sudden changes in the EGT or N2. There appears to be no transient behavior or relatively sudden changes in the EGT or N2 occurring faster than the time constants describing the rate of blade tip to rotor growth. Thus before the climb segment, the shroud 72 can be expanded by flowing relatively hot thermal control air 36 to heat the shroud 72 in order to accommodate the growth of the blade as measured from the engine axis 8 to the blade tip 82 and avoid a rub. Recognition of the flight segment within which an aircraft is operating and the predictability of the time at which an aircraft will transition from one flight segment to another are important in determining an active clearance control protocol in DYCIS. The Markov chain structure's states and their transition probabilities determine the turbine blade tip clearance CL set by DYCIS for transition. The turbine blade tip clearance CL for the ACC system illustrated herein is the demand clearance DCL.

A given flight segment has with it an associated measure of stability. Stability is to be taken to mean near-term predictability. If, within a particular segment, the maximum of the blade radius R as measured from the engine axis 8 (rotor center) to the blade tip 82 can be accurately predicted, then the particular segment is said to be stable. The cruise segment of the flight referenced in FIG. 6 appears relatively stable as there is only a small change in the EGT and core speed, N2. The climb segment shows some variation in EGT and N2 and thus may not appear as nearly stable as the cruise segment. But variation in EGT and N2 does not necessarily render a segment less stable.

Determining stability is based on predictability, and predictability is based on the three following sets of data. The first set is historical data that has been gathered and analyzed over previous flights of the specific engine or the specific engine type or both is the first set of data. The second set is cueing data that adumbrates imminent change in flight operation that will affect EGT or N2 or any other variable or sets of variables that will change the requirement for the blade radius R as measured from the engine axis 8 (rotor center) to the blade tip 82 is the second set of data. Some examples of cueing data include communications between the aircraft pilot and ground control personnel, such communications could possibly concerned with requesting or requiring a change in altitude; (b) messages from other aircraft advising of poor flying conditions at present altitude; and (c) accelerometer indication of vibration due to turbulence. These three examples of cueing data are only examples and other types of cueing data may be used. The third set is programmed data that is entered by supervisory personnel such as an air traffic authority or the pilot/co-pilot. Such data includes but is not limited to flight plans and NOTAMs (notices to airmen) which are notices that contain information concerning the establishment, condition or change in any aeronautical facility, service, procedure or hazard, the timely knowledge of which is essential to personnel concerned with flight operations.

Figure 7:
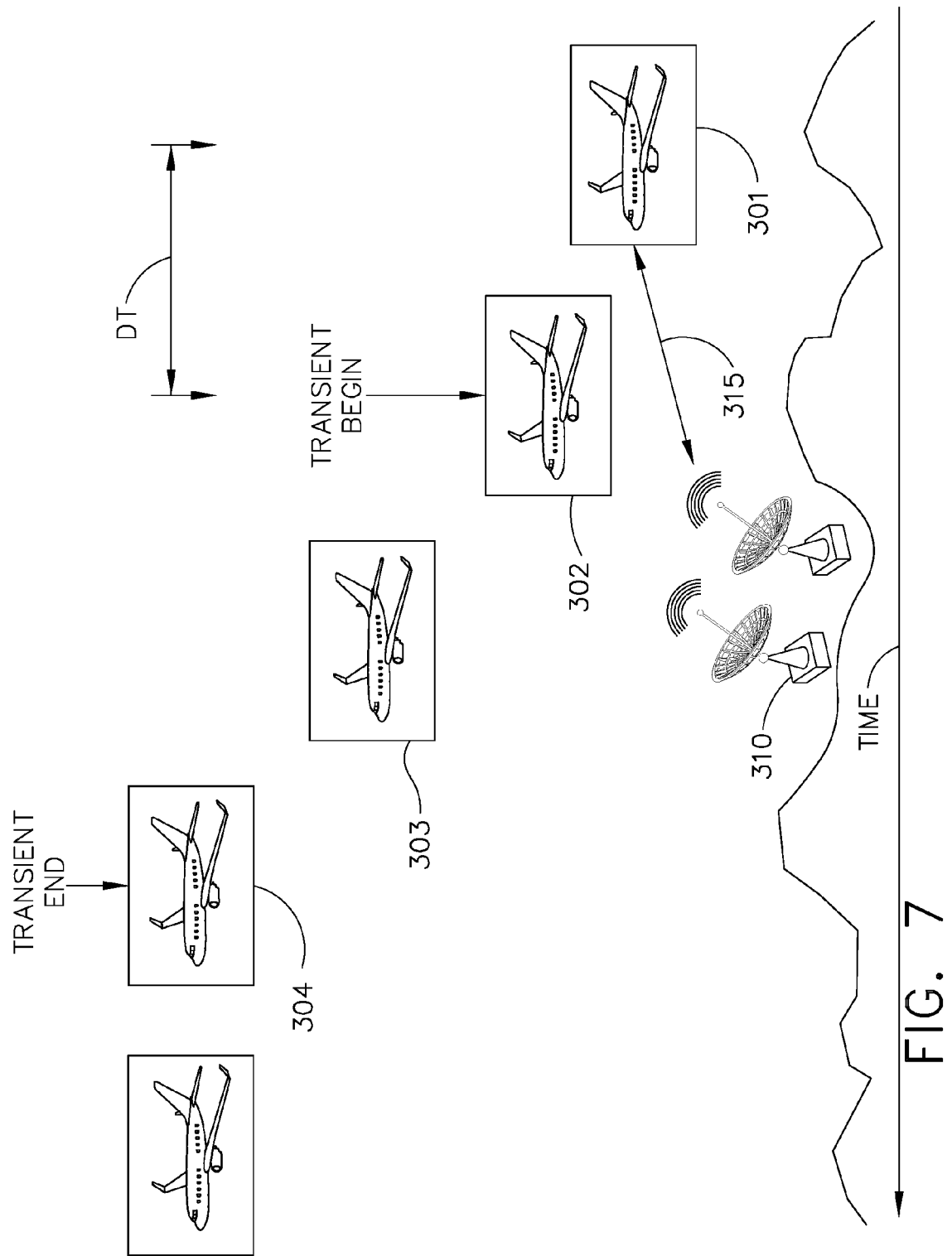
FIG. 7 is a diagrammatical illustration of an exemplary embodiment of a flight using the anticipatory blade tip clearance control method for the engine illustrated in FIG. 1.

FIG. 7 illustrates a gas turbine engine powered aircraft in level flight 301. At level flight 302, the aircraft crew increases the throttle angle, the rotor speed increases, the EGT rises, and the aircraft begins a climb through position 303 to its new flight level 304. The onset of the transient at 302 is anticipated in 301 and there is a period of time DT used to start opening the shroud before the blade tips begin elongating. In one embodiment of the DYCIS, the crew initiates a transmission 315 from the aircraft to an air traffic control (ATC) facility 310. The transmission 315 is an exemplary engine transient anticipatory event. Initiation of the transmission is detected by an on-aircraft module that then performs two functions. The first of these functions is to cause the shroud 72 to begin expanding as fast as possible by flowing hot thermal control air 36 on the shroud 72 and opening up the blade tip clearance CL. The second of these functions is to start a timer that will override any ACC control of the blade tip clearance CL and require the shroud 72 to continue expanding. If the shroud has fully expanded, the system will continue overriding ACC control of the blade tip clearance CL and keep the shroud fully expanded until a preset interval has passed since the detected crew initiation of aircraft—ATC communications which is the exemplary engine transient anticipatory event.

Figure 8:
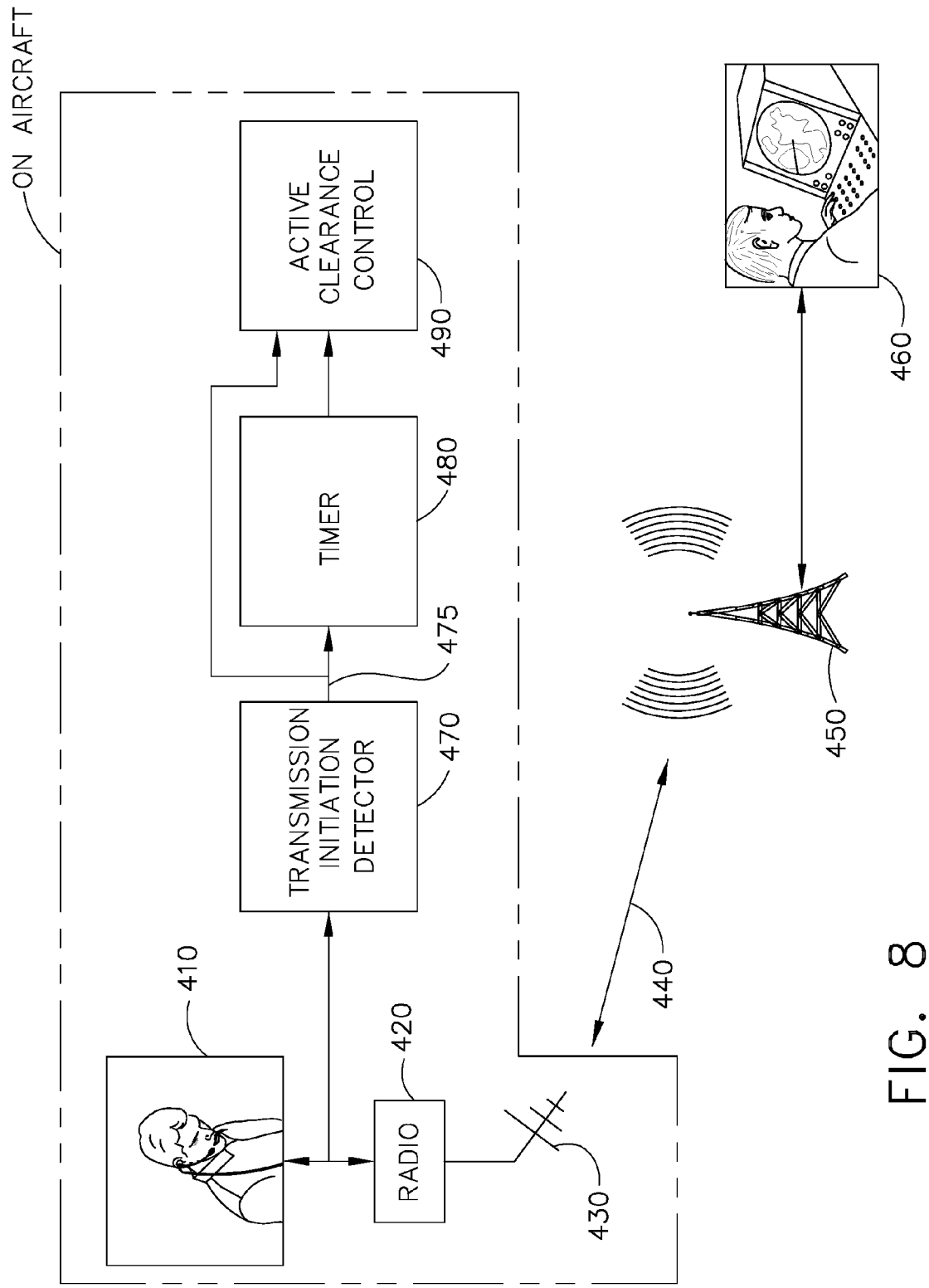
FIG. 8 is a diagrammatical illustration of an exemplary embodiment of communications used during a flight using the anticipatory blade tip clearance control method for the engine illustrated in FIG. 1.

In another embodiment of DYCIS illustrated in FIG. 8, the crew 410 initializes, or keys, a transmission 440 by radio 420 and an antenna 430 to ATC personnel 460 through ground-based ATC communication facilities 450. The initialization of this transmission is detected by an on-aircraft transmission initiation detector module 470. The output 475 of the transmission initiation detector module 470 is input to the on-aircraft active clearance control module 490 and commands the clearance control module 490 to open the shroud 72 to its maximum aperture as quickly as possible. The shroud 72 is opened to its maximum aperture as quickly as possible by flowing hot thermal control air 36 on the shroud 72 which opens up or increases the blade tip clearance CL. The output 475 is also input to an on-aircraft timer module 480 that commands the active clearance control module 490 to keep the shroud open at its maximum expansion for a preset interval after the transmission initiation detector module 470 detects initiation of a transmission.

Figure 9:
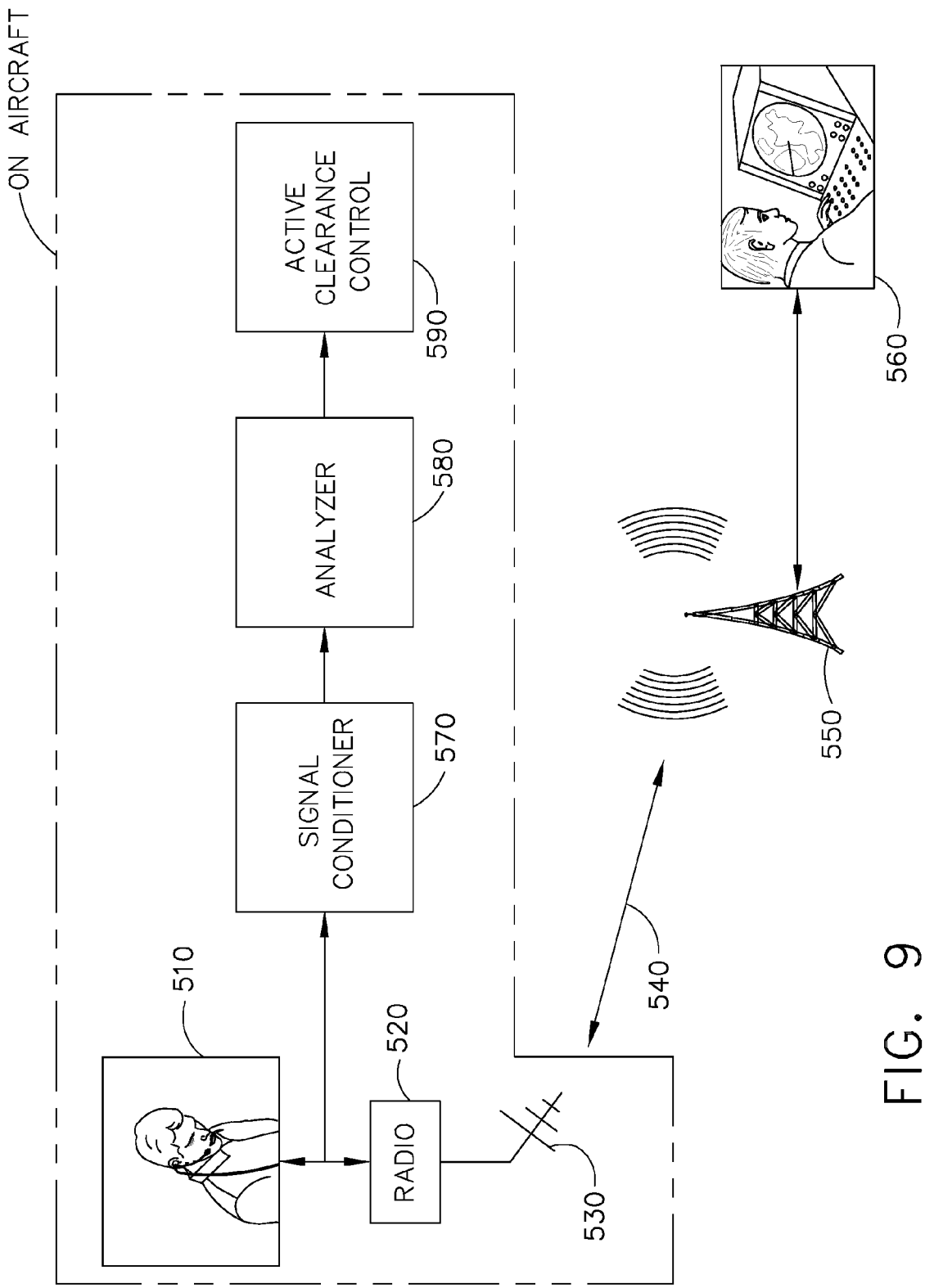
FIG. 9 is a diagrammatical illustration of a second exemplary embodiment of communications used during a flight using the anticipatory blade tip clearance control method for the engine illustrated in FIG. 1.

In another embodiment of DYCIS illustrated in FIG. 9, the crew 510 initiates an aircraft communication 540 by radio 520 and an antenna 530 to ATC personnel 560 or the crew receives a communication 540 from ATC personnel 560 through ground-based ATC communication facilities 550. In both cases, the communication is transmitted in a baseband signal to an on-aircraft signal conditioner module 570 that converts the baseband signal to a digital stream if the baseband signal is analog. The baseband signal may already be a digital stream. The signal conditioner module 570 formats the digital stream into a data stream that is subsequently analyzed by an analyzer module 580. The analyzer module 580 analyzes the communications content of the crew to ATC communications in an attempt to discover intent of impending transient activity. For example, if the analyzer module 580 detects that the crew 510 has requested an altitude change from ATC personnel 560, or if the analyzer detects that ATC personnel 560 are directing an altitude change, then the analyzer module 580 will command the active clearance control module 590 to open the shroud to its maximum aperture as quickly as possible because such a command foreshadows an engine transient.

Figure 10:
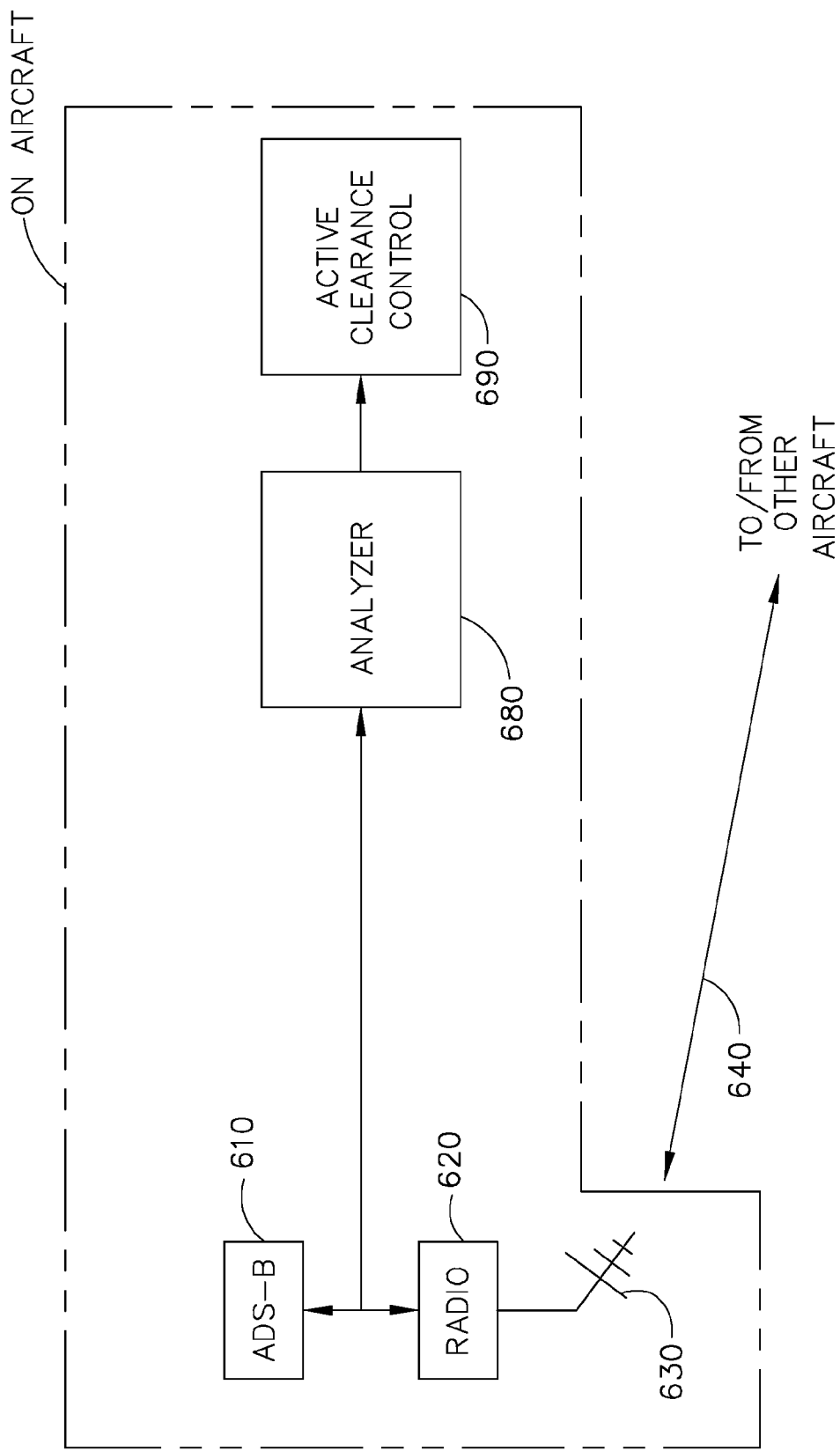
FIG. 10 is a diagrammatical illustration of a third exemplary embodiment of communications used during a flight using the anticipatory blade tip clearance control method for the engine illustrated in FIG. 1.

Another embodiment of DYCIS illustrated in FIG. 10, is used for flight operations under free-flight conditions and digital communications 640 are conducted between the aircraft and an air traffic control surrogate such as by using an automatic dependent surveillance broadcast (ADS-B) function. ADS-B is described in the International Civil Aviation Organization's First Meeting of Directors of Civil Aviation of the Caribbean Region (CAR/DCA/1), held at Grand Cayman, Cayman Islands, 8-11 Oct. 2002. ADS-B is described as a surveillance technology that enables applications that allow both pilots and controllers to have a common picture of airspace and traffic. ADS-B airborne systems serve as air traffic control surrogates that transmit an aircraft's identity, position, velocity, and intent to other aircraft and to air traffic control systems on the ground, thus allowing for common situational awareness to all appropriately equipped users of the National Airspace System (NAS). As illustrated in FIG. 10, the ADS-B 610 communicates with other aircraft through a radio 620 and an antenna 630. ADS-B communications are monitored by an on-aircraft analyzer module 680 that detects intent to change altitude and commands the active clearance control module 690 to open the shroud to its maximum aperture as quickly as possible.

Figure 11:
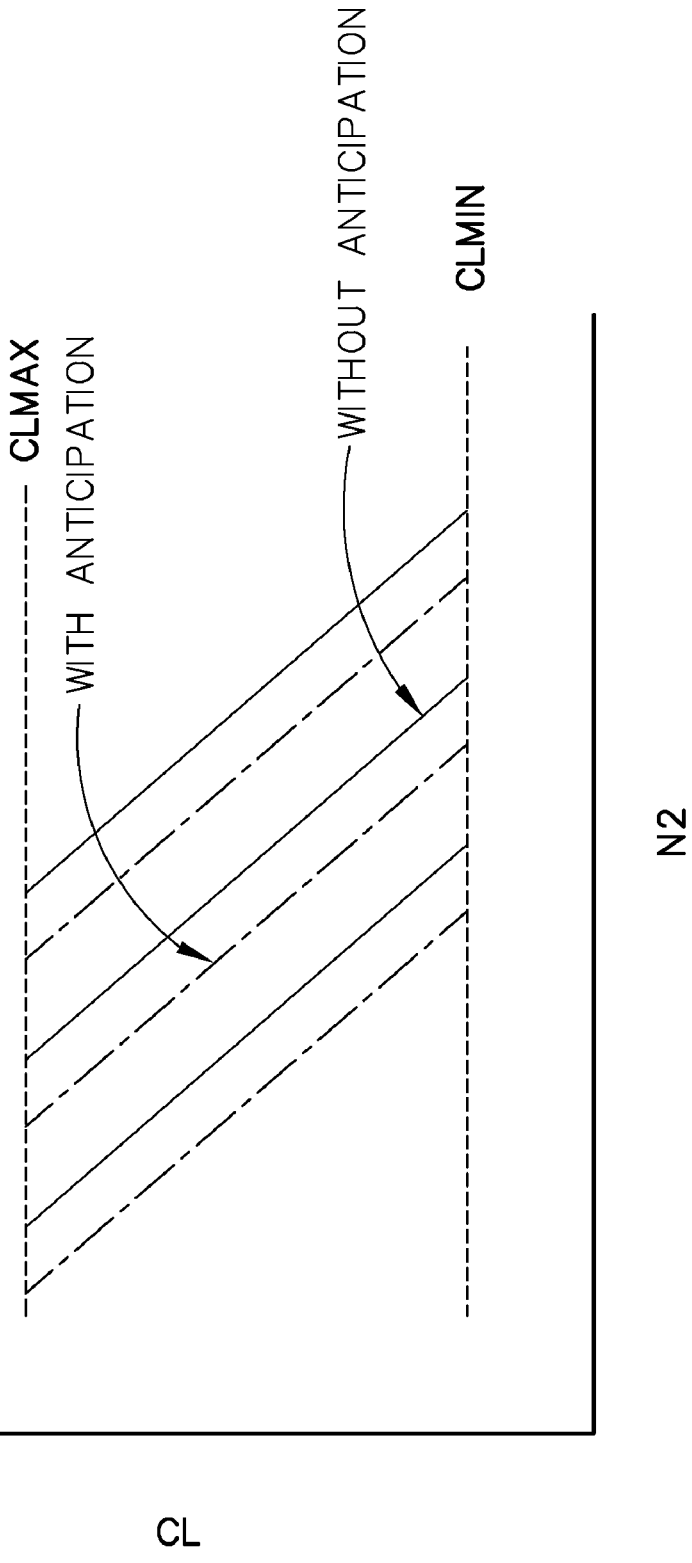
FIG. 11 is a graphical illustration of a blade tip clearance schedule for an exemplary embodiment of an anticipatory blade tip clearance control method compared to a blade tip clearance schedule for a non-anticipatory blade tip clearance control method for the engine illustrated in FIG. 1.

Illustrated in FIG. 11 is a comparison of blade tip clearance schedules, between a maximum blade tip clearance CLMAX and a minimum blade tip clearance CLMIN, with and without anticipation of an engine transient such as during aircraft climb. The blade tip clearance schedules are illustrated as the blade tip clearance CL versus core rotor speed N2 for an active clearance control system that anticipates the onset of an engine transient labelled with anticipation and an active clearance control system that does not anticipate the onset of an engine transient labelled without anticipation. The anticipatory method and system uses a lower blade tip clearance because it begins shroud expansion a period of time DT before the engine transient to reduce the probability of a rub which allows maintaining a small as possible tip clearance between the blade tips and the surrounding shroud thereby gaining engine fuel efficiency. The blade tip clearance schedule for a clearance control system that anticipates the onset of an engine transient is lower than for a clearance control system that does not anticipate the onset of an engine transient labelled without anticipation for the same engine. The anticipatory method and system may be retro-fitted in old engines. The anticipatory method and system may be incorporate anticipatory shroud expansion a period of time DT before the engine transient as an override to the schedule of the blade tip clearance CL which in turn may be in the active clearance control system ACC.

While there have been described herein what are considered to be preferred and exemplary embodiments of the present invention, other modifications of the invention shall be apparent to those skilled in the art from the teachings herein and, it is therefore, desired to be secured in the appended claims all such modifications as fall within the true spirit and scope of the invention. Accordingly, what is desired to be secured by Letters Patent of the United States is the invention as defined and differentiated in the following claims.

What is claimed is:

1. A method to adjust blade tip clearance between rotating blade tips and a surrounding shroud in an aircraft gas turbine engine in flight, the method comprising:
monitoring aircraft and aircraft crew data with a controller wherein the aircraft crew data includes communications between aircraft crew and air traffic control authorities or air traffic control surrogates,
automatically changing the tip clearance in anticipation of and before an engine command that changes an engine rotational speed, and
changing of the tip clearance based on at least one of the monitored data.

2. The method as claimed in claim 1 further comprising the engine command being changing fuel flow to the engine.

3. The method as claimed in claim 1 further comprising determining when to begin adjusting the tip clearance by expanding or contracting the shroud by blowing or impinging thermal control air on thermal control rings or a turbine casing supporting the stator shroud a period of time before the engine command that changes the engine rotational speed.

4. The method as claimed in claim 3 further comprising modifying when to begin adjusting the tip clearance by using learning algorithms.

5. The method as claimed in claim 4 further comprising using the aircraft gas turbine engine's operating experience and/or operating experience of other jet engines for the learning algorithms.

6. The method as claimed in claim 5 further comprising the other jet engines being on an aircraft containing the aircraft gas turbine engine and/or on other aircraft.

7. The method as claimed in claim 3 further comprising using a statistical method for determining when to begin adjusting the tip clearance.

8. The method as claimed in claim 7 wherein the statistical method for determining when to begin adjusting the tip clearance is selected from a group consisting of statistical methods, correlation methods, multivariate statistical process analysis, and pattern recognition methods.

9. The method as claimed in claim 7 further comprising the statistical method for determining when to begin adjusting the tip clearance being a pattern recognition method selected from a group consisting of Bayesian decision theory, neural networks, fuzzy logic, Parzen windows, nearest neighbor classification, hidden Markov models, linear and non-linear discriminant analysis, Markov random fields, Boltzmann learning, classification and regression trees, and multivariate adaptive regression.

10. The method as claimed in claim 1 further comprising overriding an active clearance control flow model used to schedule desired blade tip clearance with the changing of the tip clearance in anticipation of and before an engine command that changes an engine rotational speed.

11. The method as claimed in claim 10 further comprising determining when to begin adjusting the tip clearance by expanding or contracting the shroud by blowing or impinging thermal control air on thermal control rings or a turbine casing supporting the stator shroud a period of time before the engine command that changes then engine rotational speed.

12. The method as claimed in claim 11 further comprising modifying when to begin adjusting the tip clearance by using learning algorithms.

13. The method as claimed in claim 12 further comprising using the aircraft gas turbine engine's operating experience and/or operating experience of other jet engines for the learning algorithms.

14. The method as claimed in claim 13 further comprising the other jet engines being on an aircraft containing the aircraft gas turbine engine and/or on other aircraft.

15. The method as claimed in claim 11 further comprising using a statistical method for determining when to begin adjusting the tip clearance.

16. The method as claimed in claim 15 wherein the statistical method for determining when to begin adjusting the tip clearance is selected from a group consisting of statistical methods, correlation methods, multivariate statistical process analysis, and pattern recognition methods.

17. The method as claimed in claim 15 further comprising the statistical method for determining when to begin adjusting the tip clearance being a pattern recognition method selected from a group consisting of Bayesian decision theory, neural networks, fuzzy logic, Parzen windows, nearest neighbor classification, hidden Markov models, linear and non-linear discriminant analysis, Markov random fields, Boltzmann learning, classification and regression trees, and multivariate adaptive regression.

18. The method as claimed in claim 1 further comprising determining when to begin adjusting the tip clearance by expanding the shroud by blowing or impinging thermal control air on thermal control rings or a turbine casing supporting the stator shroud a period of time before an engine command associated with climb.

19. The method as claimed in claim 18 further comprising using a statistical method for determining when to begin adjusting the tip clearance.

20. The method as claimed in claim 19 further comprising using historical data from the engine in the statistical method for determining when to begin adjusting the tip clearance.

21. The method as claimed in claim 20 wherein the statistical method for determining when to begin adjusting the tip clearance is selected from a group consisting of statistical methods, correlation methods, multivariate statistical process analysis, and pattern recognition methods.

22. The method as claimed in claim 20 further comprising the statistical method for determining when to begin adjusting the tip clearance being a pattern recognition method selected from a group consisting of Bayesian decision theory, neural networks, fuzzy logic, Parzen windows, nearest neighbor classification, hidden Markov models, linear and non-linear discriminant analysis, Markov random fields, Boltzmann learning, classification and regression trees, and multivariate adaptive regression.

23. The method as claimed in claim 20 further comprising using aircraft and aircraft crew data indicative of the engine command in historical data.

24. The method as claimed in claim 23 further comprising the aircraft and aircraft crew data indicative of the engine command in historical data including communications between aircraft crew and air traffic control authorities or air traffic control surrogates.

25. The method as claimed in claim 1 further comprising changing the tip clearance by blowing or impinging thermal control air on structure supporting the shroud in anticipation of and before an engine command that changes an engine rotational speed.

26. The method as claimed in claim 25 further comprising monitoring aircraft and aircraft crew data indicative of the engine command and changing the tip clearance based on the monitored aircraft and aircraft crew data.

27. The method as claimed in claim 26 further comprising the aircraft and aircraft crew data indicative of the engine command in historical data including communications between aircraft crew and air traffic control authorities or air traffic control surrogates.

28. The method as claimed in claim 25 further comprising the engine command being changing fuel flow to the engine.

29. The method as claimed in claim 25 further comprising determining when to begin adjusting the tip clearance by expanding or contracting the shroud a period of time before the engine command that changes the engine rotational speed.

30. The method as claimed in claim 29 further comprising modifying when to begin adjusting the tip clearance by using learning algorithms.

31. The method as claimed in claim 30 further comprising using the aircraft gas turbine engine's operating experience and/or operating experience of other jet engines for the learning algorithms.

32. The method as claimed in claim 31 further comprising the other jet engines being on an aircraft containing the aircraft gas turbine engine and/or on other aircraft.

33. The method as claimed in claim 29 further comprising using a statistical method for determining when to begin adjusting the tip clearance wherein the statistical method for determining when to begin adjusting the tip clearance is selected from a group consisting of statistical methods, correlation methods, multivariate statistical process analysis, and pattern recognition methods.

34. The method as claimed in claim 29 further comprising using a statistical method for determining when to begin adjusting the tip clearance wherein the statistical method for determining when to begin adjusting the tip clearance being a pattern recognition method selected from a group consisting of Bayesian decision theory, neural networks, fuzzy logic, Parzen windows, nearest neighbor classification, hidden Markov models, linear and non-linear discriminant analysis, Markov random fields, Boltzmann learning, classification and regression trees, and multivariate adaptive regression.

35. The method as claimed in claim 25 further comprising overriding an active clearance control flow model used to schedule desired blade tip clearance with the changing of the tip clearance in anticipation of and before an engine command that changes an engine rotational speed.

36. The method as claimed in claim 25 further comprising determining when to begin adjusting the tip clearance by expanding the shroud a period of time before an engine command associated with climb.

* * * * *